United States Patent
Purosto et al.

(10) Patent No.: US 11,524,875 B2
(45) Date of Patent: *Dec. 13, 2022

(54) ELEVATOR WITH LINEAR MOTOR

(71) Applicant: KONE Corporation, Helsinki (FI)

(72) Inventors: Tero Purosto, Helsinki (FI); Tero Hakala, Helsinki (FI); Jouni Ratia, Helsinki (FI); Ilya Petrov, Helsinki (FI)

(73) Assignee: KONE CORPORATION, Helsinki (FI)

( * ) Notice: Subject to any disclaimer, the term of this patent is extended or adjusted under 35 U.S.C. 154(b) by 572 days.

This patent is subject to a terminal disclaimer.

(21) Appl. No.: 15/834,407

(22) Filed: Dec. 7, 2017

(65) Prior Publication Data
US 2018/0105396 A1    Apr. 19, 2018

Related U.S. Application Data

(63) Continuation of application No. PCT/EP2015/064535, filed on Jun. 26, 2015.

(51) Int. Cl.
*B66B 11/04*    (2006.01)
*B66B 7/04*    (2006.01)
(Continued)

(52) U.S. Cl.
CPC .......... *B66B 11/0407* (2013.01); *B66B 7/044* (2013.01); *B66B 9/003* (2013.01);
(Continued)

(58) Field of Classification Search
CPC ..... B66B 11/0407; B66B 7/044; B66B 9/003; B66B 2009/006; H02K 41/02
See application file for complete search history.

(56) References Cited

U.S. PATENT DOCUMENTS 3,658,155 A    4/1972    Salter
5,126,604 A    6/1992    Manning
(Continued)

FOREIGN PATENT DOCUMENTS

CN    1053331 A    7/1991
CN    1024335 C    4/1994
(Continued)

OTHER PUBLICATIONS

International Search Report for PCT/EP2015/064535 dated Apr. 5, 2016.
(Continued)

*Primary Examiner* — Diem M Tran
(74) *Attorney, Agent, or Firm* — Birch, Stewart, Kolasch & Birch, LLP

(57) ABSTRACT

An elevator includes at least one elevator shaft and at least one elevator car traveling in the elevator shaft. The elevator has at least one elevator motor including at least one linear stator located vertically along the elevator shaft and at least one mover located in connection with the elevator car and co-acting with the stator. The elevator includes a vertical stator beam supporting at least one stator, which stator beam has at least one side face carrying ferromagnetic poles of said stator spaced apart by a pitch. The mover includes at least one counter-face facing the side face(s) of the stator beam, in which electro-magnetic components of the mover are located.

26 Claims, 7 Drawing Sheets

(51) Int. Cl.
*B66B 9/00* (2006.01)
*B66B 13/00* (2006.01)
*H02K 37/00* (2006.01)
*H02K 41/02* (2006.01)

(52) U.S. Cl.
CPC .............. *B66B 13/00* (2013.01); *H02K 37/00* (2013.01); *H02K 41/02* (2013.01)

(56) References Cited

U.S. PATENT DOCUMENTS

| | | | |
|---|---|---|---|
| 5,141,082 A | | 8/1992 | Ishii et al. |
| 10,549,954 B2* | | 2/2020 | Ginsberg .................. B66B 9/02 |
| 2007/0199770 A1* | | 8/2007 | Kocher ............... B66B 11/0407 187/277 |
| 2013/0249324 A1 | | 9/2013 | Gandhi et al. |
| 2014/0190774 A1* | | 7/2014 | Hsu .......................... B66B 9/003 187/406 |
| 2016/0083226 A1* | | 3/2016 | Piech .................. B66B 11/0407 187/250 |
| 2017/0327345 A1* | | 11/2017 | Steinhauer .......... B66B 11/0407 |

FOREIGN PATENT DOCUMENTS

| | | |
|---|---|---|
| CN | 101875464 A | 11/2010 |
| CN | 202508725 U | 10/2012 |
| JP | 3-3885 A | 1/1991 |
| JP | 4-197980 A | 7/1992 |
| JP | 8-91741 A | 4/1996 |
| JP | 9-52668 A | 2/1997 |
| JP | 2002-101682 A | 4/2002 |
| JP | 2013-86950 A | 5/2013 |
| WO | WO 2014/113006 A | 7/2014 |
| WO | WO 2015/084366 A1 | 6/2015 |

OTHER PUBLICATIONS

Written Opinion of the International Searching Authority for PCT/EP2015/064535 dated Apr. 5, 2016.

* cited by examiner

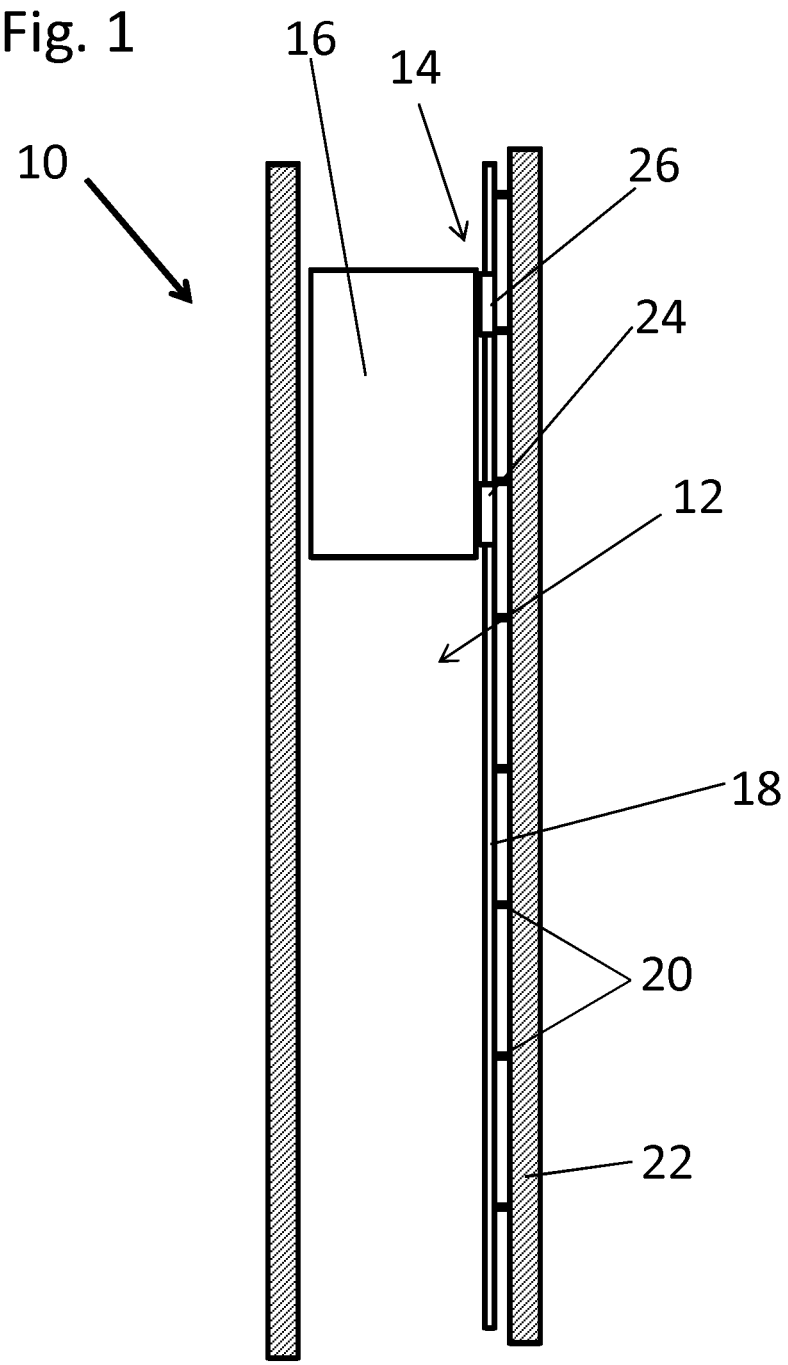

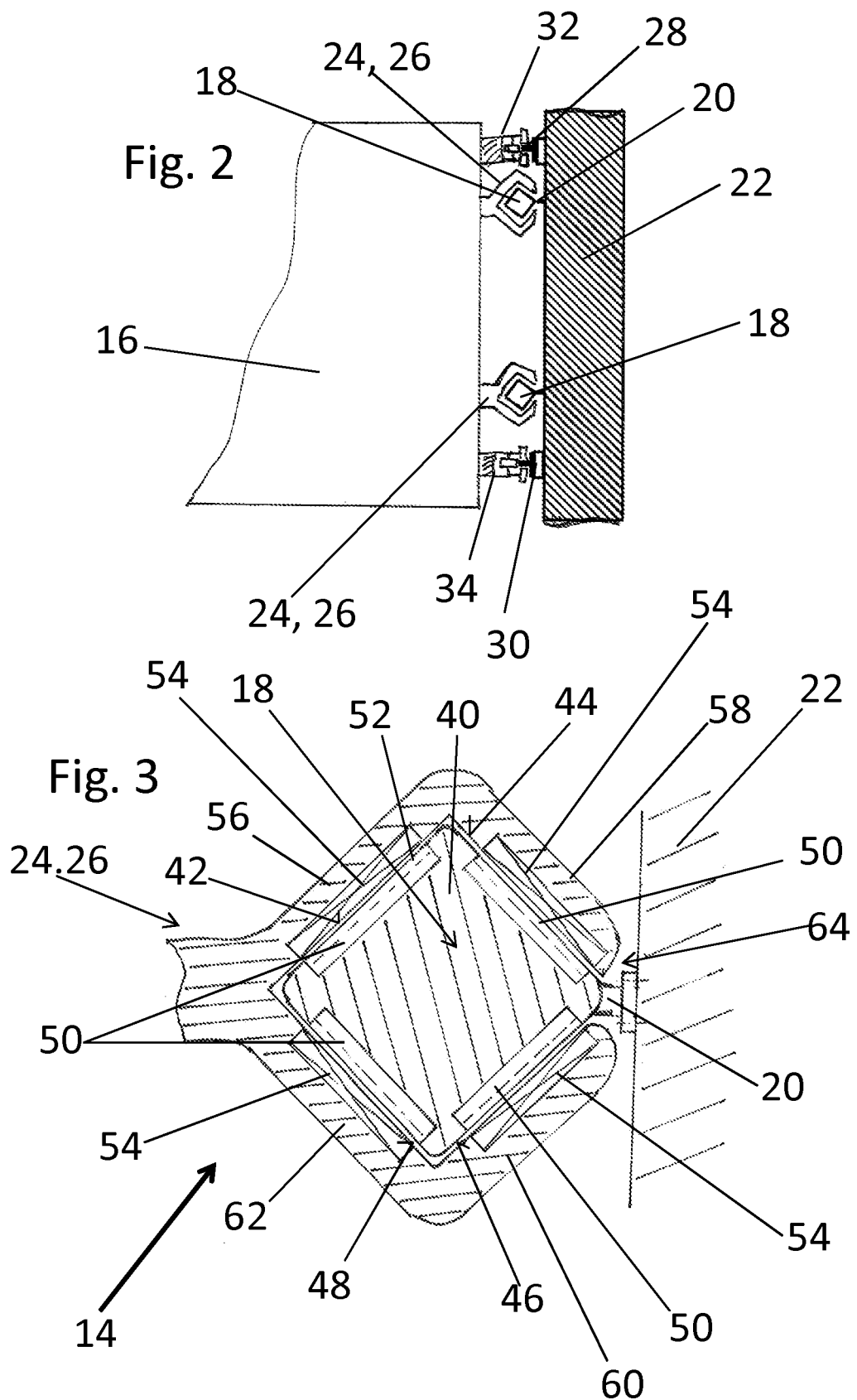

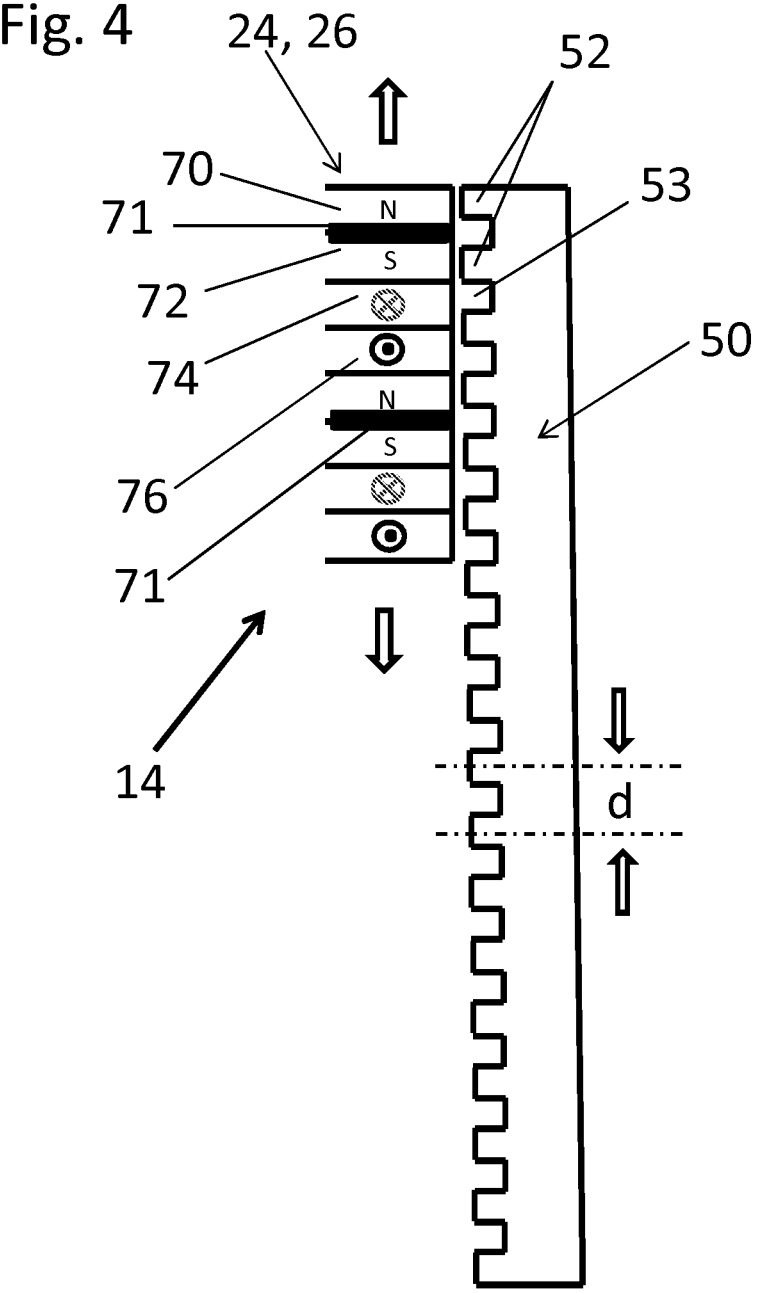

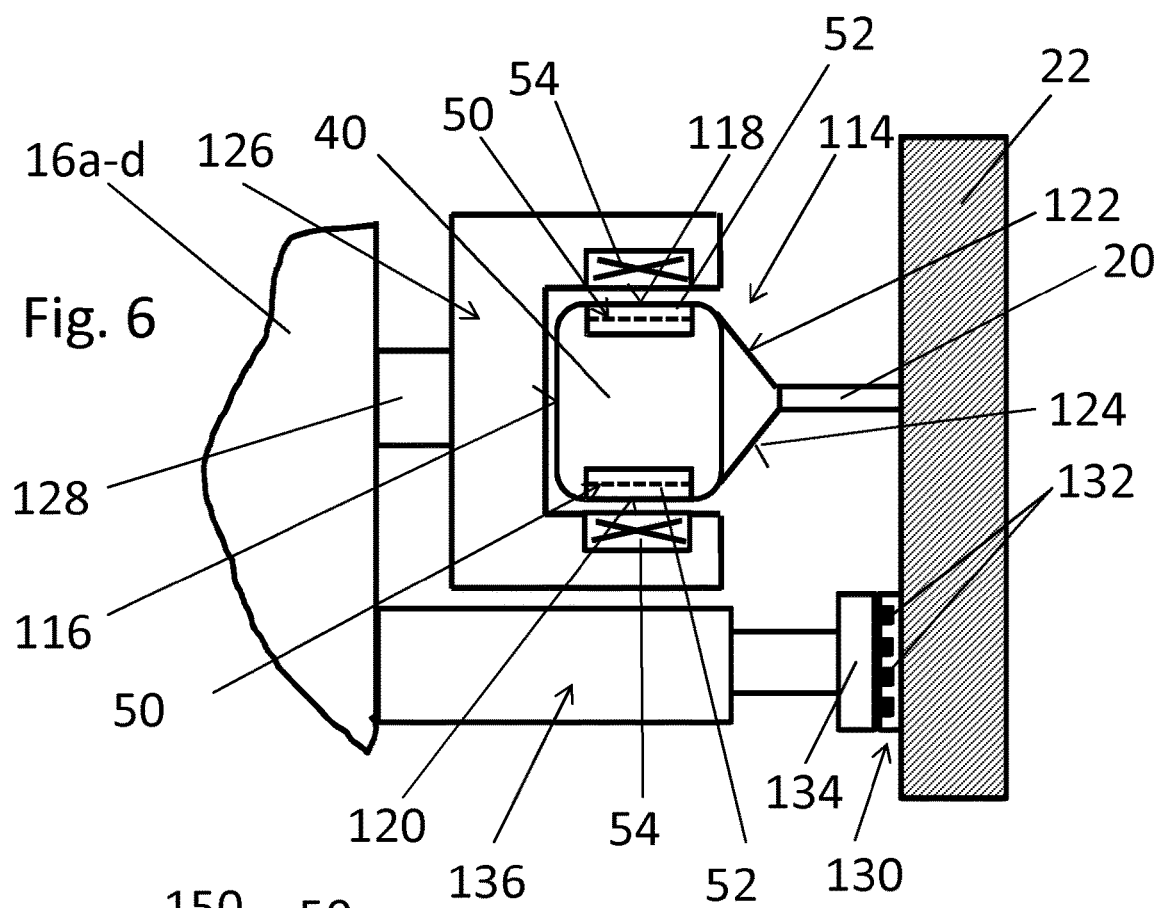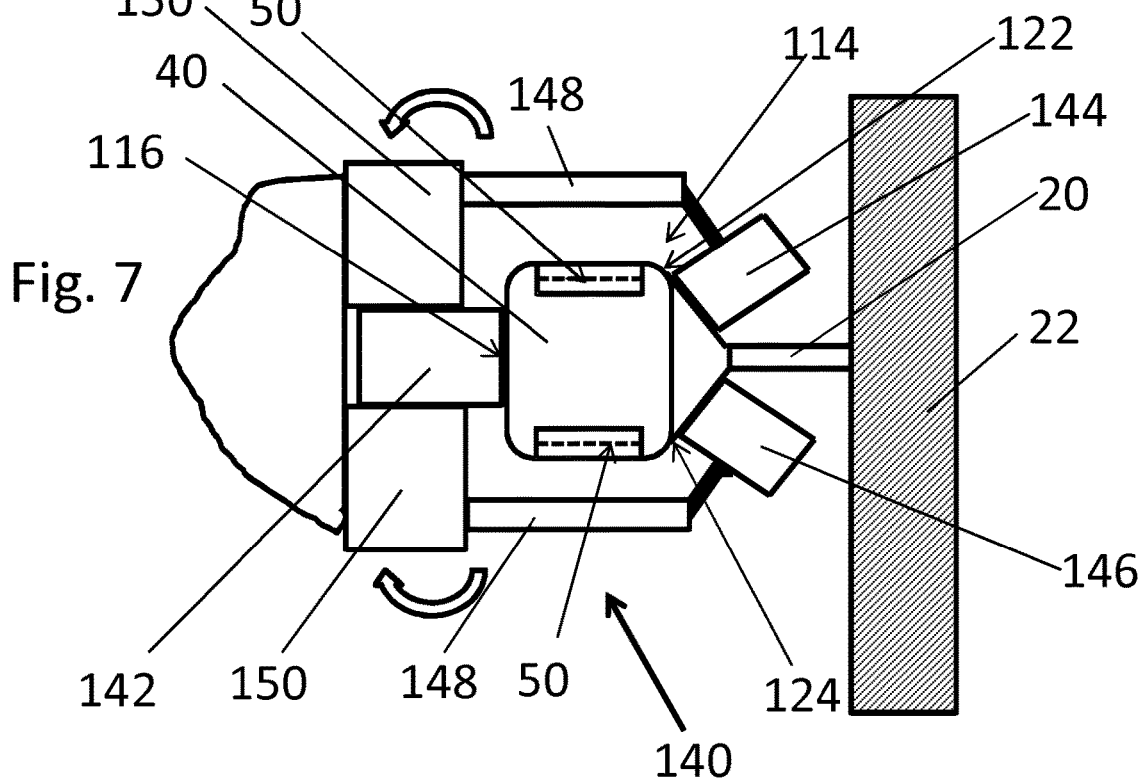

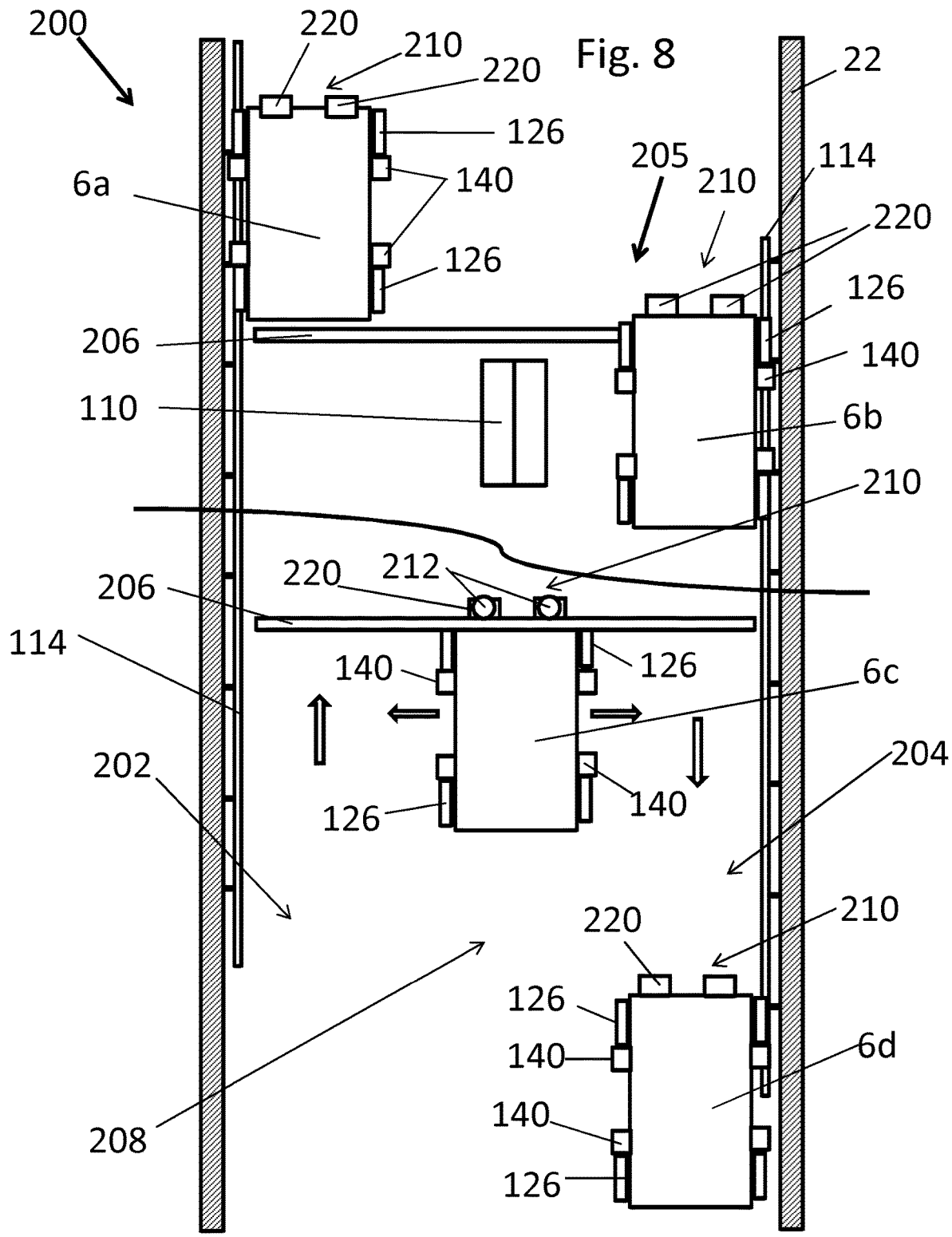

ELEVATOR WITH LINEAR MOTOR

CROSS REFERENCE TO RELATED APPLICATIONS:

This application is a Continuation of PCT International Application No. PCT/EP2015/064535, filed on Jun. 26, 2015, which is hereby expressly incorporated by reference into the present application.

BACKGROUND OF THE INVENTION

The present invention relates to an elevator having a linear stator extending along the elevator shaft. The elevator car carries a mover which comprises the rotor components of the electric motor as e.g. windings and/or permanent magnets. Thus, the mover moving along with the elevator car and the linear stator mounted along the shaft form a linear motor in the vertical direction of the elevator shaft. Such kind of motors are per se known. A disadvantage of these motors is caused by the fact that the linear stator comprising windings and/or permanent magnets are quite expensive, particularly if higher elevator shafts are considered with a length of e.g. 50 m or more. Furthermore, the weight of such a linear stator adds up considerably when used already for a mid-rise elevator.

SUMMARY OF THE INVENTION

It is therefore object of the present invention to provide an elevator with a linear motor which is comparably cheap to manufacture and which is adapted also for high rise elevators.

This object is solved with an elevator according to claim 1. Preferred embodiments of the invention are subject-matter of the dependent claims. Embodiments of the invention are also shown in the description and in the drawings. The inventive content may also consist of several separate inventions, especially if the invention is considered in the light of explicit or implicit subtasks or with respect to advantages achieved. In this case, some of the attributes contained in the claims below may be superfluous from the point of view of separate inventive concepts. The features of different embodiments of the invention can be applied in connection with other embodiments within the scope of the basic inventive concept.

According to the invention, the elevator comprises at least one elevator shaft and at least one elevator car traveling in said elevator shaft. The elevator has at least one elevator motor comprising at least one linear stator located vertically along the elevator shaft and at least one mover located in connection with the elevator car and co-acting with the stator. According to the invention, the elevator comprises a vertical stator beam supporting said at least one stator, which stator beam has at least one side face carrying ferromagnetic poles of said stator spaced apart by a pitch, and which mover comprises at least one counter-face facing said side face of the stator beam, in which counter-face electro-magnetic components of the mover, as e.g. mover irons, windings and permanent magnets are located.

The advantage of the present invention is therefore that the linear stator only needs ferromagnetic poles which can be for example stator teeth formed in a side face of a stator rod made of ferromagnetic material, for example made of iron or an iron-containing alloy. Via this means, the vertical beam supporting the linear stator can be made more light-weight and can thus be used for high elevators, particularly for elevators with a height of more than 50 m, preferably of more than 100 m. This linear elevators concept is therefore adapted for any high-rise applications as this solution does not need any elevator ropes which are an obstacle in the design of high-rise elevators because of the correlated weight. Preferably, the stator beam comprises a vertical support structure for at least two stators and at least one fastening element to fix the support structure to the elevator shaft. The advantage of this construction is that the motor force can be doubled up as the stator beam now comprises two stators and a correspondingly larger force generating surface of the linear elevator motor.

Preferably, the stator beam in the elevator shaft and the mover of the elevator car form guide means for the travel of the elevator car in the elevator shaft. Usually a car is guided with guide rollers along guide rails extending vertically in the elevator shaft. This common technology can advantageously been omitted if the stator beam itself together with the mover of the elevator car form the guide means for the elevator to keep him horizontally fixed with respect to the stator beam. This can be done e.g. in one alternative by providing guide faces on the stator beam which coact with corresponding guide means (e.g. rollers) at the elevator car. Preferably the guide means for the elevator car is provided by the stator poles and the electromagnetic components of the linear motor. This provides a kind of magnetic guide similar to a magnetic monorail as known in high-velocity trains.

Thus, most preferably the ferromagnetic stator poles of the stator beam and the electro-magnetic components of the mover form a magnetic bearing for the guide and suspension of the elevator car.

Preferably the movers are centralized around the respective stators beams by means of the magnetic bearing formed by the stators and the electro-magnetic components of the mover(s). The windings of the mover are controlled such that air gap is maintained between stator side faces and the mover counter-faces. By this means the stator beam and mover form the combined drive as well as the guide of the elevator car in the shaft. Thus the elevator car is free form separate guide means as guide rollers or guide surfaces co-acting with any kind of guide rails.

In a preferred embodiment of the invention the mover has separate magnetic bearing coils which are controlled independent of electro-magnetic mover components of the linear motor. The purpose of the separate magnetic bearing coils is only, to regulate the air gap of the linear motor. The magnetic bearing coils of the mover coact with the linear stator, preferably with the stator iron, to correct any deviations in length/thickness of the air gap. Preferably they are disposed as an extension to the mover, above and below the electro-magnetic mover components, i.e. the linear motor coils/magnets.

Preferably, the two stators are located at opposite sides of the vertical stator beam so that horizontal forces between the stator beam and the mover are eliminated or at least essentially reduced.

In the most preferred embodiment of the invention, the movers are centralized around the respective stators by means of a magnetic bearing, which can e.g. be formed by the electro-magnetic components of the stator and mover of the linear motor. Via said magnetic bearing a constant air gap is maintained between stator and mover counterfaces.

In an embodiment of the invention, the stator beam may also comprise guide surfaces for guide rollers of the elevator car.

Preferably, the elevator motor of the invention is a flux-switching permanent magnet motor which is for example shown in US 2013/0249324 A1. Such a motor is cost-effective, provides high thrust and can operate well even under fault conditions.

Preferably, the vertical stator beam has at least two side faces with stator poles having the same pitch and wherein the pitch of the stator poles of both side faces is preferably in vertical direction mutually offset, either by a half pitch, preferably, all 4 stators are offset by ¼ pitch relative to each other. Via this embodiment, the cogging torque of this 3-phase linear motor is reduced, so that the effectivity of the motor is better and the movement is smoother.

In a preferred embodiment of the invention, the stator beam has a polygonal cross-section and has several side faces carrying ferromagnetic stator poles, which side faces are connected via corners. This solution offers the advantage that several stators can be located in connection with the stator beam which several stators are configured to co-act with a corresponding number of counter-faces located in one or several movers connected with the elevator car. Via this means, the drive force, i.e. power of the motor, can essentially be increased whereas horizontal forces can essentially be reduced.

In a preferred embodiment of the invention the cross-section of the stator beam is preferably rectangular, particularly square. In this case, four side faces are obtained carrying ferromagnetic stator poles, whereby the stators of the opposite side faces may have the same pitch as well as the same position of the stator poles whereas the side faces located rectangular to each other have the same pitch but are vertically offset preferably by a half pitch. With this embodiment, the horizontal faces perpendicular to the side faces are eliminated and on the other hand by the offset of the pitch of the rectangular side faces, the torque ripple of the elevator motor are reduced to a half so that the motor operates more effectively and runs smoother.

Preferably, the mover has a vertically extending C-profile or U-Profile surrounding the stator beam. These profiles allow the easy surrounding of the stator beam in a way that the counter-faces of the mover are oriented with a small air gap opposite to the corresponding side faces of the stator beam. On the other hand, the opening in the C- or U-profile is configured to adapt the fastening elements of the stator beam at the shaft wall or any construction fixed in the elevator shaft. In some embodiments, the mover takes short piece of stator beam, which remains inside the mover when car moves to adjacent shaft.

The advantage of a U-profile is also that the U-profile can be detached from the stator beam when moved horizontally in the direction of the base member of the U-profile.

In a preferred embodiment of the invention, at least two elevator cars are configured to travel within one elevator shaft. This is very effective as the elevator comprising two elevator cars in one shaft which are at least partly moving independently of each other increase the transport capacity of the elevator. Of course, the independence of the movement of the two cars is restricted by the fact that the movement of each elevator car has to consider the position and the movement of the other car and the shaft so that any collision is avoided. The arrangement of two elevator cars in one shaft is also facilitated by the fact that both cars can operate with the same stator beams because the operation of the car is controlled only by the control of the mover, whereas the stator is a pure passive element.

In a preferred embodiment of the invention, the elevator has at least two elevator shafts located side by side which are connected at their top and/or bottom ends by a horizontal passage, whereby the two elevator shafts are configured to accommodate more than two elevator cars traveling therein. Via the horizontal passages at the top and/or bottom, the two elevator shafts form a kind of combined transport system. In this case, it is most preferred if a horizontal passage is provided in the top as well as in the bottom end of the elevator shafts so that a kind of closed loop is realized by both elevator shafts and the corresponding top and bottom horizontal passages. This enables the running of several elevator cars in these two shafts in a circular movement which means in one shaft upwards and in the other shaft downwards. With this arrangement, the transport capacity of the elevator can be essentially increased as in each elevator shaft, all cars move only in one and the same direction.

In this solution it is of course possible to provide horizontal passages also in-between the upper and lower ends, for example at each floor. Then the loop an elevator car travels must not extend from the top to the bottom of the shaft. This essentially increases the transport capacity of the elevator.

In this case, it may be preferable if the landing doors are located within the horizontal passages. This solution is preferably adapted to meet upwards peak traffic or downwards peak traffic as the elevator cars are not obliged to drive the full shaft length of both shafts but from the starting floor, the elevator has only to travel the length of the most remote exit floor given by an elevator call. Furthermore, a car stopping at a landing for passengers to enter and to leave does not block the elevator shaft so that other cars can pass the stopped car while passengers enter or leave it.

For the movement of the elevator car in the horizontal passage or passages, a horizontal moving mechanism is provided which transfers the elevator car from one shaft to the other, preferably in both directions. If the landing doors are located in the area of the horizontal passage, the horizontal moving mechanism also drives the elevator car into the correct position with its car doors aligned with the landing doors.

Preferably, the horizontal moving mechanism comprises a horizontal moving means mounted in connection with the elevator car, preferably comprising rollers, whereby preferably at least one of said rollers is driven. Further, the horizontal moving means comprises at least one, preferably two, horizontal guide tracks located in the horizontal passage and extending through this passage into both elevator shafts on both sides of the horizontal passage. When a car enters the top or bottom end of the elevator shaft or an exit floor, the movers are controlled to position the elevator car in a way with respect to the horizontal guide tracks that the moving means of the elevator car is located above the guide tracks. Now the rollers of the moving means are moved to get into contact with the horizontal guide tracks so that the weight of the elevator car is now carried by the horizontal moving means and the horizontal guide tracks located in the horizontal passage and the elevator shafts. After the rollers grip the horizontal guide tracks, the movers can be switched off and can be detached from the corresponding stator beams which is for example easily possible if the movers are U-profiles and the vertical stator beams are located on the side of the elevator shafts which is opposite to the horizontal passage. If the floor is an exit floor, then the horizontal moving means drives the elevator car to its landing position behind the landing doors so that the car door and the landing doors are aligned. And after having people left and/or entered the elevator car, the trip of the elevator car is either continued in the same direction by moving the car back to the elevator shaft from where it came or, if the elevator car is to run in the counter-direction, the moving means moves the elevator car to the other elevator shaft where the elevator cars run in the opposite direction than before.

This solution therefore offers a possibility to get the elevator car out of the elevator shaft or both elevator shafts at any point where the horizontal guide tracks are located, i.e. preferably at each elevator floor, and on the other hand, the car may move from the horizontal passage to both directions according to the intended further travel direction of the car. It is apparent that this elevator system essentially increases the capacity of the elevator in total. Accordingly, in such a closed loop system with two elevator shafts located side by side and being connected with several horizontal passages, 5, 8 or even 12 elevator cars can be located according to the length of the elevator shaft. For example, if the elevator shaft is to serve a high-rise elevator and the shaft length is appropriately 400 m, even 20 elevator cars can be located in the two elevator shafts whereby of course always some of the elevator cars are currently located in the horizontal passage of an elevator floor while other elevator cars drive in the same direction either in the one elevator shaft upwards or in the other elevator shaft downwards. Thus, with a construction of only two elevator shafts and of horizontal passages in-between, an elevator system with a comparably large number of elevator cars can be constructed which was previously only possible with a corresponding number of elevator shafts. Therefore, in a given amount of space, the transport capacity of the elevator can be drastically increased, particularly in high-rise elevators.

Preferably, the rollers of the horizontal moving mechanism of the elevator car are movable from a retracted position where they do not protrude from the side faces of the elevator car into a drive position where the rollers co-act with the horizontal guide tracks located in the horizontal passages. This drive position is preferably secured by a locking means which can only be unlocked after the movers of the elevator car are in engaging contact with the corresponding stator beams in one of the elevator shafts. Thus the drive position is ensured also in case of power-off.

Preferably, the elevator cars are rucksack suspended with the guide rails and stator beams located on the shaft sides of the elevator shaft which are opposite to the horizontal passages. This solution allows the releasing of the stator beams and of the guide rails by corresponding mechanisms after the horizontal moving mechanism has secured the elevator car to horizontal guide tracks of a horizontal passage. Preferably, the elevator car has movers and guide rollers on the two opposite sides of the elevator car facing the two elevator shafts. This means that depending on which shaft the elevator car is currently traveling, it is rucksack suspended either on its left side or right side with respect to the car door. Preferably, in this case, the car door is then located in a vertical plane extending parallel to the horizontal passages.

Preferably, at least a part of the guide rollers of the elevator car is releasable from the corresponding guide rail. Via this means, it is possible to release the elevator car from the corresponding guide rail in the elevator shaft so that it can travel with the horizontal moving mechanism through the horizontal passage to the other elevator shaft or to a landing door located beside the elevator shaft.

In an embodiment of the invention the stator beam can be formed by the stator itself, e.g. by a stator rod. In one embodiment of the invention the stator beam can e.g. be formed by a square metal rod having teeth on two opposite sides.

Preferably, a vertical conductor rail or bus bar is located along the length of the elevator shaft, and the car has at least one contactor, preferably with contact rollers, connecting the conductor rail or bus bar. Conventionally, the elevator car is connected via car cables to the elevator control which car cables hang between the elevator car and a fixing part connected to the elevator shaft. As now the elevator car is traveling between two shafts, the connection of the elevator car via car cables isn't possible any longer. Therefore, the connection via a bus bar or vertical conductor rail located along the shaft length is preferable as on one hand, this connection is independent of the length of the elevator shaft and is therefore particularly designed for high-rise elevators.

Furthermore, the initiating and releasing of the electric connection between the bus bar and the contactor of the elevator car is easy to realize based on the horizontal movement of the elevator car when driving into or coming from the horizontal passage. Therefore, the bus bar is located preferably at the shaft side opposite to the horizontal passage so that when the elevator car moves into the elevator shaft, the contactor drives against the bus bar simultaneously with the elevator car driving horizontally with its movers into engagement with the vertical stator beam(s). In this case, the connector of the elevator car is pressed against the bus bar or conductor rail located in connection with the shaft wall or with the vertical stator beam. Preferably, the contactor is supported on the car via a support element which comprises a spring means to bias the contactor against the conductor rail or bus bar which ensures a proper electric contact during the vertical travel of the elevator car in the shaft.

Preferably, the elevator car has a wireless connection to the elevator control which ensures a control connection with the elevator control also during the horizontal movement of the elevator car in the horizontal passage, when the car contactor has no contact to the conductor rail or bus bar.

Preferably, the elevator car has a power source as for example a battery or an accumulator, which is preferably also configured as back-up power source for the mover. With this power source, all electric loads of the elevator car can be fed. These loads are the movers, the lightings, ventilation, door drives and of any IO devices of the elevator car as for example car display panels, loudspeakers, displays, etc. Furthermore, the power of a wireless data connection with the elevator control can be supplied with the power source.

In this case, preferably the operation of the mover always runs via the power source whereby the power source is loaded via the conductor rail as long as the contactors of the elevator car are in contact with the conductor rail or bus bar. Via this means, it is ensured that the mover keeps working in any case of power failure. The capacity of the power source is preferably sufficient to drive the elevator car to a predetermined location in the elevator shaft or to the next landing in the elevator shaft. Preferably, also the horizontal moving mechanism, particularly the horizontal moving means of the elevator car, is supplied via the power source of the elevator car.

In an alternative preferred embodiment, the power supply from the shaft to the elevator car is implemented with coupled coils principle, whereby a primary coil being mounted to the elevator shaft (e.g. at a floor) and a secondary coil is moving with the car. When the car arrives at a floor, primary and secondary are coupled and power is fed from primary to secondary to a battery mounted to car. The primary coil may be in every stopping floor.

In a preferred embodiment of the invention, the power source can be located in the DC intermediate circuit of the frequency converter forming the electric drive of the mover.

Preferably, the power source also feeds the gripping mechanism of a gripping device or safety gear as to bias the gripping device in release position. This ensures that in any event of power-off of the power source of the elevator car, the gripping device is immediately activated which keeps the elevator car gripped at the guide rails or the vertical stator beam(s), preferably if these act as guide rails.

In case a power failure of the main happens and the elevator car is currently supported by any of the horizontal guide tracks of the uppermost or lowermost horizontal passage or by a horizontal passage in any elevator floor, the elevator car is driven to the corresponding landing door, if this is located in the horizontal passage, so that the passengers located in the elevator car can exit the car without problems.

Preferably, at least two parallel stator beams are located in the (each) elevator shaft and the elevator car has at least two movers located parallel to each other and in a horizontal distance of at least half of the car width, whereby each of these movers co-act with one of the stator beams. Via this arrangement, the driving force is doubled up as now two elevator motors are provided in parallel. Furthermore, the car suspension is better balanced between the several stator beams.

Furthermore, preferably, the elevator car has at least two movers located above each other and spaced apart in the upper and lower half of the elevator car. Thus, not only two movers can be located parallel and aside of each other, but also above each other so that on one car side, four movers can be located which leads to a corresponding distributed and increased moving force of the elevator motors.

Preferably, the ferromagnetic poles of the stator are formed by teeth provided on a side face of a ferromagnetic stator rod, which teeth are spaced apart by teeth gaps. Such a ferromagnetic stator rod is for example a rod comprised of iron or iron alloy to which the teeth structure has been milled in a side face of said rod, which teeth structure then forms a side face of the stator beam. Such a stator rod is easy to produce and can be easily supported in the stator beam of the present invention, eventually forming the stator beam.

Furthermore, the number of elevator shafts connected by horizontal passages does not necessarily be two but also may be three or four whereby for control reasons, the connection of two shafts is preferred.

The side face of the stator beam and the corresponding counter-face of the mover may be round or rounded. Thus, the stator beam may have a circular cross-section.

The stator beam may be connected via fastening elements to the elevator shaft, which fastening elements are connected to at least one corner or to one side of the stator beam.

The stator poles may be stator teeth are embodied in a vertical stator bar or rod. In this case the stator beam preferably comprises a vertical support structure for at least two stator bars and fastening elements to fix the support structure.

The teeth gaps between the stator teeth are preferably filled with a polymer material to provide together with the teeth a smooth side face of the stator beam, avoiding the accumulation of dirt.

The counter-face of the mover is preferably arranged in a recess or through-hole of the mover which recess or through-hole surrounds the stator beam in the horizontal cross-section at least partially.

The elevator may have an emergency unit configured to control the mover to drive the car to the next landing and to control the horizontal moving mechanism to drive the car to a landing door between the shafts.

Of course the elevator may be part of an elevator group or of a multi-group where, particularly in a high-rise building, there are elevator groups in several vertical zones located above each other, which zones preferably have common transfer floors and eventually shuttle elevators connecting them. The elevator of the invention is preferably adapted to form such a shuttle elevator, but also any other of these elevators in the elevator groups. An elevator with two connected shafts may also form one elevator group of a multi-group elevator.

According to a preferred embodiment of the invention, the stator(s) does not have any permanent magnets and as well as no magnetizing coils or windings either.

Following expressions are used as a synonym: car—elevator car, shaft—elevator shaft, stator poles—stator teeth, windings—coils.

For the skilled person it is obvious that components mentioned in connection with the present invention can be provided one one-fold or multi-fold according to the needs. For example, one vertical stator beam can co-act with three movers located above each other at the elevator car. Furthermore, two stator beams may be located at a wall of the elevator shaft or even more than two stator beams as e.g. three or four stator beams.

BRIEF DESCRIPTION OF THE DRAWINGS

The invention is now described hereinafter with respect to the enclosed drawing. In this drawing FIG. 1 shows a side view of an elevator shaft with a linear elevator motor according to the invention comprising two parallel vertical stator beams, FIG. 2 shows a horizontal cross-section of the parts of the elevator motor and the guide rails in the area between the elevator car and the shaft wall of FIG. 1, FIG. 3 shows a cross-section through a stator beam and a mover of FIG. 4, FIG. 4 shows a schematic drawing of the function of a switching permanent magnet motor (FSPM) used as the elevator motor, FIG. 6 shows a horizontal cross-section of the connecting part between the shaft wall and an elevator car at the mover position, having a U-profile mover and a contactor contacting a vertical bus bar located at the elevator shaft wall, FIG. 7 shows a horizontal cross-section of the connecting part between the shaft wall and an elevator car at the car guide position, showing a guide element of the elevator car with two pivoted guide rollers which guide element is running along guide surfaces of the stator beam of FIG. 6, FIG. 8 shows a schematic side view of an elevator system having two elevator shafts which are connected with horizontal passages at each elevator floor whereby the landing doors are located in the area of the horizontal passages between each shaft.

DESCRIPTION OF THE PREFERRED EMBODIMENTS

Figure 5:
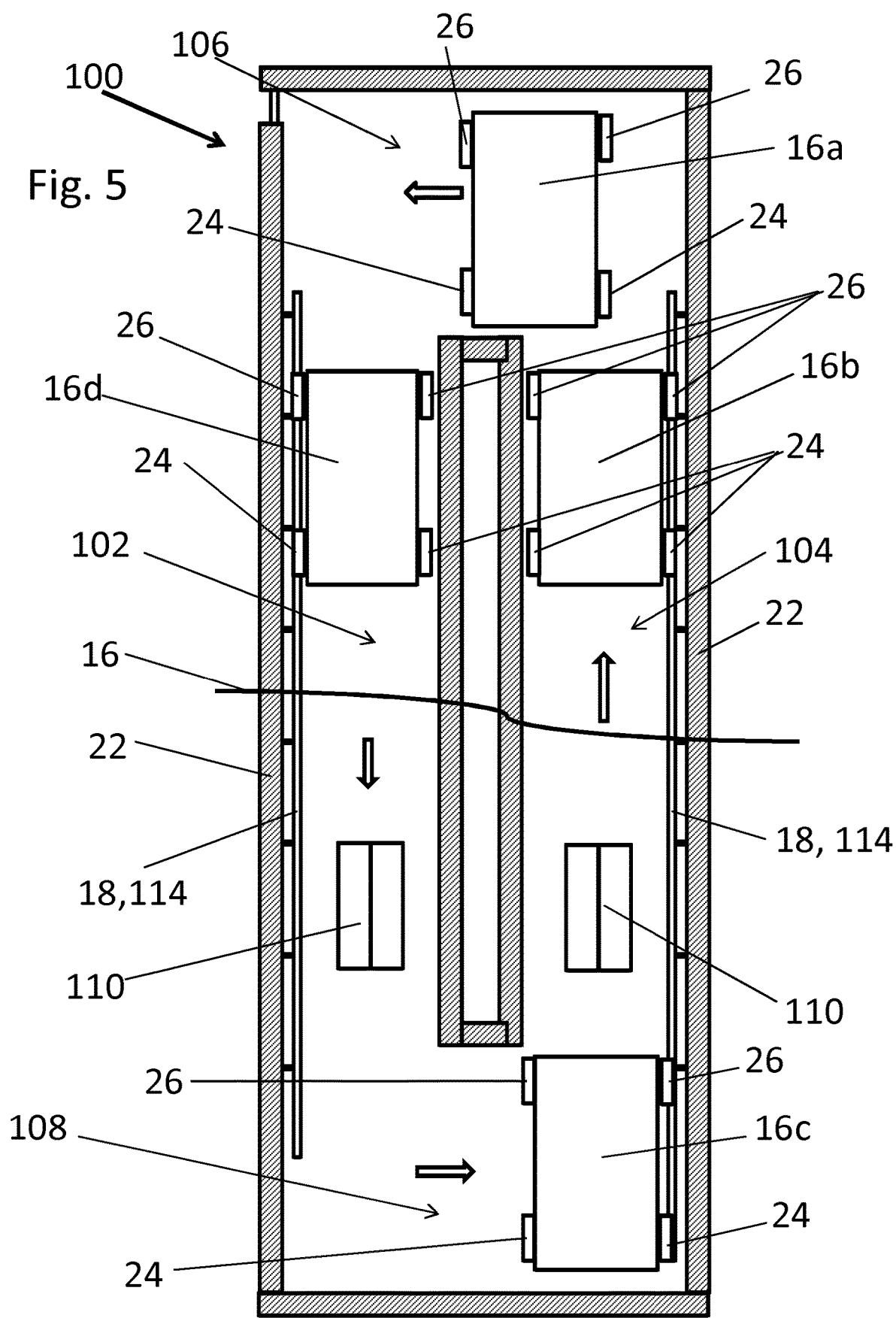
FIG. 5 shows a side view of an elevator having two elevator shafts which are connected at their upper and lower ends with horizontal passages.

It is emphasized that identical parts or parts with the same functionality are designated by the same reference numbers in all figures.

FIG. 1 shows an elevator 10 comprising an elevator shaft 12 wherein an elevator car 16 moves up and down. The elevator 10 has a linear elevator motor 14. The linear elevator motor 14 comprises stators 50 (see FIG. 3) located in a side face of a stator beam 18 which is mounted with fastening elements 20 to a shaft wall 22 of the elevator shaft 12. In this example the elevator 10 has two parallel stator beams 18, which can be seen in FIG. 2.

The elevator car 16 comprises two movers 24, 26 located one above the other. The lower mover 24 is located in the lower half of the elevator car whereas the upper mover 26 is located in the upper half of the elevator car. These two movers 24, 26 comprise electro-magnetic components as e.g. irons, windings and permanent magnets 70, 71, 72, 74, 76 (FIG. 4) which co-act with stator poles 52 located in the side faces of the stator beam 18, formed by stator teeth. Accordingly, the elevator car travels upwards and downwards via corresponding control of both movers 24, 26 co-acting with the stator beams 18.

Of course, the elevator car has a corresponding set of two movers 24, 26 for each vertical stator beam 18 so that the elevator car 16 has in total four movers, two lower movers 24 and two upper movers 26 to co-act with two stator beams 18.

Of course, each stator beam 18 may have one or several stators 50 as it is shown in FIGS. 2 and 3.

Although it is preferred that the stator beams 18 and movers 24, 26 of the elevator 10 of FIG. 1 also form an electro-magnetic guide for the elevator car 16 so that any guide rollers and guide rails can be omitted, FIG. 2 shows in one embodiment optional car guides 32, 34 of the elevator car 16 co-acting with optional guide rails 28 running vertically along the shaft wall 22 of FIG. 1. The shaft wall 22 comprises two parallel guide rails 28, 30 co-acting with corresponding car guides 32, 34. Each car guide 32, 34 has a set of guide rollers co-acting with the car guide rails 28, 30. As these car guides 32, 34 in connection with the car guide rails 28, 30 are configured for a rucksack type suspension, the corresponding guide system 28, 30, 32, 34 is configured to keep the car 16 horizontally in connection with the shaft wall 22 as these both car guide rails 28, 30 are the only guide rails of the elevator car 16 in the shaft 12. The vertical stator beams 18 as well as the movers 24, 26 of the elevator car 16 are shown in more detail in FIG. 3. Generally, guide rails with a round cross-section may be used which are surrounded by rollers of the car guide, thereby fixing the car horizontally in connection with the guide rail.

According to FIG. 3 the vertical stator beam 18 comprises a metal support structure 40 with a square cross-section. On each side the support structure 40 carries a metal stator rod 50 comprising stator teeth 52, which form the four side faces 42, 44, 46, 48 of the stator beam 18. Each of these stator rods (or bars) 50 with the stator teeth 52 forms a stator of the linear motor 14 so that the stator beam 18 shown in FIG. 3 comprises four stators. The stator teeth 52 co-act with windings 74, 76 (FIG. 4) and mover irons 70,72 and permanent magnets 71 located along counter-faces 54 in the four arms 56, 58, 60, 62 of the C-type profile of the mover 24, 26. This C-type profile of the mover surrounds the stator beam 18 but leaves an opening 64 for the adaption of the fastening elements 20, as the mover 24, 26 travels along the shaft 12.

The stator rods 50 on all four side faces 42, 44, 46, 48 have the same pitch d. Anyway, the first and third side face 42, 46 of the stator beam also have an identical teeth position in vertical direction whereas the second and fourth side face 44, 48 have the same pitch but the teeth position is vertically offset with respect to the stator teeth 52 on the first and third side face 42, 46 by a ¼ pitch.

Via this arrangement, it is ensured that on one hand, the horizontal forces between the stators 50 on opposite sides eliminate each other whereas the vertical offset of the pitches of the side faces oriented rectangular leads to a better efficiency and a smoother run of the elevator motor, as a moving step of such a motor 14 is a half pitch. By the fact that four stators 50 are located within the stator beam 18 the force generated between the movers 24, 26 and the stator beam 18 is multiplied by four, thereby achieving less horizontal ripples and a smoother movement of the movers 24, 26 with respect to the vertical stator beam 18.

FIG. 4 shows the operation principle of the flux switching permanent magnet motor formed by the movers 24, 26 and the stators 50 in the stator beam 18. The stator rod 50 comprises stator teeth 52 which are spaced apart by teeth gaps 53. The pitch d of the stator teeth 52 is identical throughout the length of the stator rod 50. The stator in the stator beam 18 in a longer vertical shaft 12 can be comprised of one single stator rod 50 with a corresponding length or by several stator rods 50 located one above each other, according to the required shaft length. In the connecting areas of stator rods located above each other the pitch d has to be maintained.

The mover 24, 26 comprises on each counter-face 54 a succession of two mover irons 70, 72 between which one thin magnet 71 is located. This package of mover irons 70, 72 and magnet 71 is followed by two windings 74, 76 which are controlled as to produce a magnetic field with opposite direction. This succession 70, 71, 72, 74, 76 of mover irons, permanent magnets and windings is repeated according to the length of the mover. The movement of the mover 24, 26 with respect to the stator rod is accomplished by controlling the both windings 74, 76 to switch the flux direction to the opposite so that with each switching, the mover 24, 26 moves half of the pitch d of the stator teeth 52. Thus, the mover 24, 26 can be controlled to move according to the arrows in upwards or downwards direction with respect to the stator rod 50.

FIG. 5 shows an elevator 100 having two elevator shafts 102, 104 which are connected by an upper horizontal passage 106 at the top end of both shafts 102, 104 as well as a lower horizontal passage 108 at the bottom end of both elevator shafts 102, 104. Thus, the both elevator shafts 102, 104 with the upper and lower horizontal passage 106, 108 form a closed loop whereby the movement of the elevator cars 16a-16d is only allowed in one direction according to the arrows shown in the figure. By this measure it is ensured that cars run only in one direction in each of the shafts which lead to a higher transport capacity and to an easier control of the cars in the shaft.

In both elevator shafts 102, 104, vertical stator beams 18, 114 e.g. according to one of the previous embodiments, or according to FIGS. 6 and 7 are located which co-act with movers 24, 26 located at the elevator cars 16a-16d. Each shaft 102, 104 may comprise preferably two, three or four parallel stator beams 18, 114. The figure shows landing doors 110 located in the first elevator shaft 102 as well as in the second elevator shaft 104. The cars 16a-16d are horizontally moved in the horizontal passages 106, 108 in a not specified manner by horizontal moving mechanisms, e.g. those shown in connection with FIGS. 8 and 9.

Both elevator shafts are cut out along the cutting line 112 for clarity reasons, as normally this concept is preferably designed for high-rise elevators having 20 floors or more. Accordingly, the two shafts 102, 104 are able to accommodate a much larger number of elevator cars than the four cars 16a-16d shown in the figure. Each car 16a-16d is able to move largely independent of the others within the two shafts 102, 104 except the fact that collisions between cars have to be avoided. By the fact that in the first elevator shaft 102 the elevator cars 16a-16d only drive downwards and in the second elevator shaft 104 only drive upwards, the probability of mutual affection is decreased. Furthermore, by this circular moving scheme, the transport capacity of both shafts is drastically increased on one hand because now the two elevator shafts may comprise much more elevator cars than in conventional systems and on the other hand, because in each elevator shaft, all elevator cars only move in the same direction, avoiding counter-movements of cars which reduce an economic shaft use and necessitate extensive anti-collision control.

FIG. 6 shows a vertical stator beam 114 which may be used in connection with the elevator 100 shown in FIG. 5 and with the elevator 200 shown in FIG. 8.

The vertical stator beam 114 comprises five side faces 116, 118, 120, 122, 124. The first side face 116 directed to the elevator car 16a-16d as well as the fourth and fifth side face 122, 124 directed to the shaft wall 22 are guide faces co-acting with guide rollers of a car guide 140 as shown in FIG. 7. The second side face 118 and the third side face 120 of the vertical stator beam 114 comprise stator rods 50 with stator teeth 52 which co-act with permanent magnets and windings 70, 71, 72, 74, 76 located in the counter-faces 54 of a mover 126 of the elevator car 16a-16d. The mover 126 is embodied as a U-profile which is mounted with a mounting element 128 to the elevator car 16a-16d. The mounting element may also be a screw or a bolt or the like such that the U-profile 126 is directly mounted to the car 16a-16d, eventually with a dampening layer in-between. As the two stator rods 50 on the second and third side faces 118, 120 of the vertical stator beam 114 are opposed to each other, the horizontal forces between the stators 50 of the vertical stator beam 114 and the components 70, 71, 72, 74, 76 of the mover 126 are compensated. On the other hand, the shaft wall 22 comprises a bus bar 130 with four vertically running connector rails 132 from which three connector rails 132 are the three phases of an AC mains network and one of the vertical connector rails 132 is a control connector connecting the elevator car with the elevator control. The elevator car comprises a contactor 134 which is pressed via a telescopic spring support 136 against the elevator car 16a-16d. Via this contactor 134, the elevator car 16a-16d is provided with electric power for the operation of the mover 126 as well as for all further car components needing electric power, as e.g. doors, I/O, lighting etc.

The vertical stator beam 114 of FIG. 6 has the advantage that it does not only support the stators 50 of the electric motor 14 of the elevator but it also provides the guide faces 116, 122, 124 to guide the car in the shaft 12, 102, 104 in connection with a car guide 32, 34, 140. The car guide 140 comprises three guide rollers 142, 144, 146 which are running on the three guide faces 116, 122, 124 of the vertical stator beam 114. The second and third guide roller 144, 146 located adjacent the shaft wall 22 are supported on pivot arms 148 which are pivotally hinged on a pivoting mechanism 150 as to be moved away from the corresponding guide surfaces 122, 124 of the vertical stator beam 114. Via this means, the vertical stator beams 114 can be released from the contact with the car guides 32, 34 by moving the car horizontally away from the shaft wall 22. As also the mover 126 is according to FIG. 6 a U-profile open to the shaft wall 22, also the mover 126 can be moved away from the vertical stator beam 114 in a horizontal direction away from the elevator shaft wall 22. Thus, the elevator cars 16a-16d can be released from the corresponding vertical stator beams 114 when moved with the horizontal moving mechanism in the upper and lower horizontal passage 106, 108 of FIG. 5, e.g. as shown in FIGS. 8 and 9.

FIG. 8 shows a second embodiment of an elevator 200 whereby the vertical stator beams 114 correspond to the stator beams shown in FIGS. 6 and 7 and the car guides 140 of the cars 16a-16d of FIG. 8 (not shown in FIG. 8) correspond preferably to the car guides 140 shown in FIG. 7. The elevator 200 of FIG. 8 comprises two elevator shafts 202, 204 which are preferably no longer separated by shaft walls. Instead, at each elevator floor, horizontal guide tracks (see also FIG. 9) 206 are extending horizontally along horizontal passages 208 located between the two elevator shafts 202, 204 whereby the term "elevator shaft" in this connection designates the vertical moving paths of the elevator cars 16a-16d in this elevator 200. The two remaining shaft walls 22 which are opposite to the horizontal passages 208 do not only comprise the vertical stator beams 114 but also the vertical bus bars 130 of FIG. 6 which are not shown for clarity reasons, as FIG. 8 focuses on the horizontal moving mechanism 205. The horizontal moving mechanism 205 comprises the horizontal guide tracks 206 on each elevator floor and a horizontal moving means 210 located on top of each elevator car 16a-16d. The horizontal moving means 210 of the elevator car comprises support rollers 212 which can be moved between a retracted position and an operational position wherein the support rollers 212 run on the horizontal guide tracks 206.

The moving pattern of the elevator cars in the elevator car 200 corresponds to that of FIG. 5 which means that in the first elevator shaft 202, the elevators all move in the same direction, i.e. upwards, whereas in the second elevator shaft 204 all elevator cars 16a-16d move downwards. Therefore, also in this elevator 200, a kind of circular movement is achieved whereby the circular movement can be shortened as the elevator cars can travel from one elevator shaft 202, 204 into the other at each elevator floor via the horizontal moving mechanism 205 comprising the horizontal guide tracks 206 and the horizontal moving means 210 of the elevator car.

Figure 9:
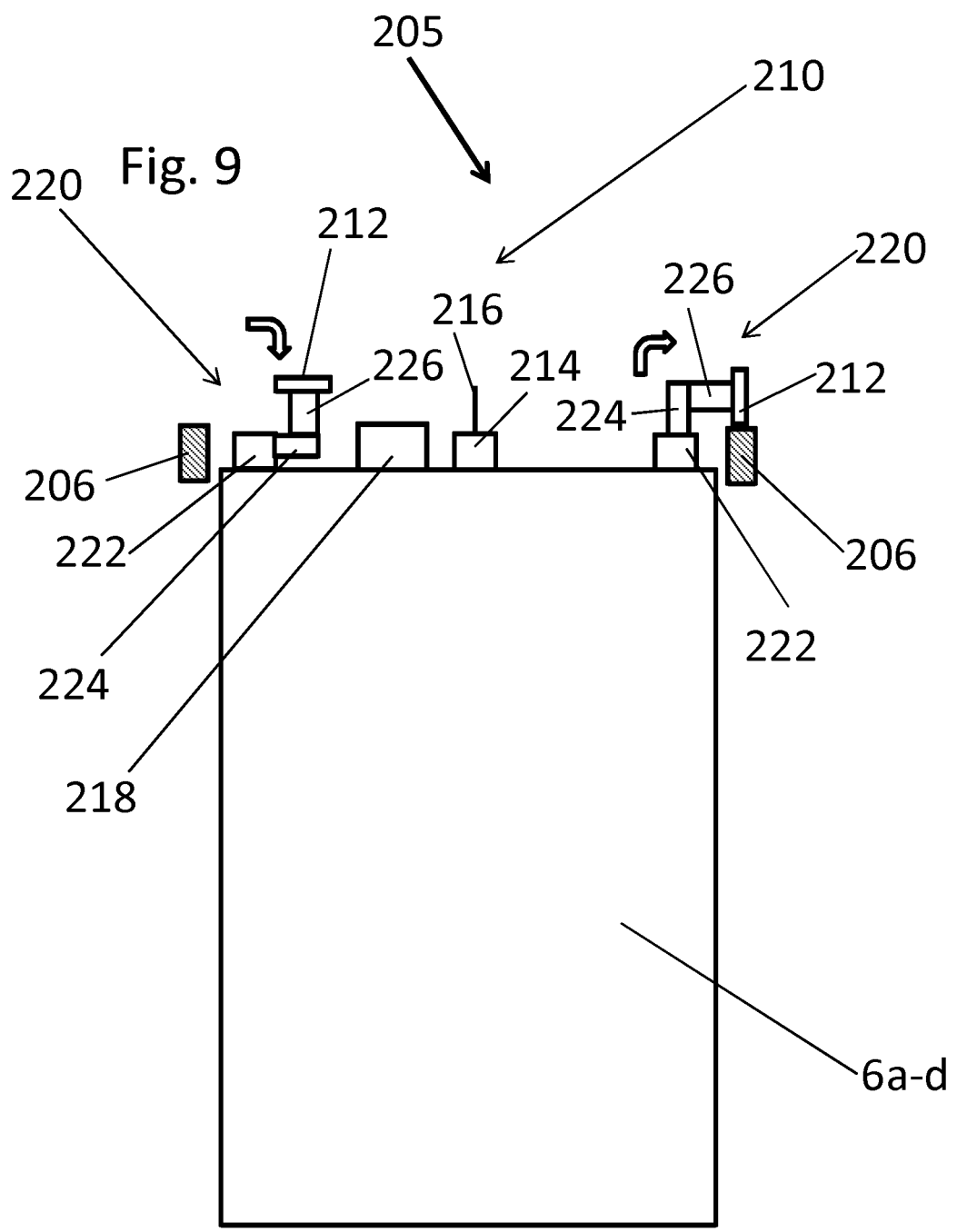
FIG. 9 shows a horizontal moving mechanism with shaft-side horizontal guide tracks and a car-side horizontal moving means comprising rollers co-acting with the horizontal guide tracks.

The function of the horizontal moving mechanism 205 based on the interaction between the horizontal guide tracks 206 and the horizontal moving means 210 of the elevator car 16a-16d is described in more detail with respect to FIG. 9. The elevator car 16a-16d comprises a car control 214 having a wireless transmission means 216 for wireless communication with the elevator control. Furthermore, the elevator car 16a-16d comprises a power source 218, preferably an accumulator, which feeds the movers 24, 26; 126 of the elevator car 16, 16a-16d as well as all other electrical components connected to the elevator car. The horizontal moving means 210 comprises of four roller arrangements 220. Each roller arrangement 220 comprises a mounting base 222 on which a support arm 224 is pivotally hinged. The support arm 224 can be moved between a retracted position (shown on the left side of the figure) and an operational position (shown on the right side) in which the support roller 212 runs on top of the horizontal guide track 206. Connected with the support arm 224 is a drive member 226 on which the support roller is supported. The drive member comprises an electric motor which is configured to rotate the support roller 212 on the horizontal guide track 206. It is self-evident that any operation of the pivot mechanism in the mounting base 222 can be prohibited when the support roller is currently positioned in the retracted position shown on the left side as well as in the operational position of the support roller 212 on the horizontal guide track 206. Therefore a locking mechanism (not shown) is preferably provided to lock the corresponding positions.

It is further clear for the skilled person that the retracted and operational position of the support roller 212 is controlled in synchronization with the initiation and releasing of the contact between the movers 126 and the corresponding vertical stator beams 114. Via this arrangement, it is ensured that the car is always supported in vertical direction either by the force of the mover 126 on the vertical stator beam 114 or by the support of the support rollers 212 on the horizontal guide tracks 206.

It is not shown in the figures but is evident for the skilled person that the elevator car has a gripping device which grips the guide faces of guide rails or of the vertical stator beams 114 when the power of the power source 218 (and eventually in case of a power failure of the mains) goes off thus ensuring that the car cannot fall downwards when the movers are not energized any longer. When a failure of the power source should occur while the car is supported via the support rollers 212 on the horizontal guide tracks 206, nothing can happen as the operation position of the support rollers 212 on the horizontal guide tracks 206 is locked even in case of power off.

Accordingly, also in this new multi-shaft multi-car arrangement of the invention, the safety of the elevator cars 16a-16d is always ensured independent whether the car is currently supported by the movers 126 and the vertical stator beams 114 or by the support rollers 212 on the horizontal guide tracks 206.

The invention can be carried out within the scope of the appended patent claims. Thus, the above-mentioned embodiments should not be understood as delimiting the invention.

LIST OF REFERENCE NUMBERS

10 elevator
12 elevator shaft
14 elevator motor
16 elevator car
18 stator beam
20 fastening elements
22 shaft wall/shaft side
24 lower mover
26 upper mover
28 first guide rail
30 second guide rail
32 first car guide
34 second car guide
40 support structure
42 first side face
44 second side face
46 third side face
48 fourth side face
50 stator/stator rod
52 stator teeth
53 teeth gaps
54 counter face of mover
56 first arm of C-profile mover
58 second arm of C-profile mover
60 third arm of C-profile mover
62 fourth arm of C-profile mover
70 first mover iron
71 permanent magnet
72 second mover iron
74 first winding
76 second winding
100 elevator (second embodiment)
102 first elevator shaft
104 second elevator shaft
106 upper horizontal passage
108 lower horizontal passage
110 landing door
114 stator beam (second embodiment)
116 first side face (first guide face)
118 second side face
120 third side face
122 fourth side face (second guide face)
124 fifth side face (third guide face)
126 mover (second embodiment)
128 mounting element
130 bus bar
132 connector rails
134 contactor
136 spring support
140 car guide (second embodiment)
142 first guide roller, at the car side
144 second guide roller, at the shaft wall side
146 third guide roller, at the shaft wall side
148 pivot arm
150 pivoting mechanism
200 elevator (third embodiment)
202 first elevator shaft
204 second elevator shaft
205 horizontal moving mechanism
206 horizontal guide track
208 horizontal passage
210 horizontal moving means mounted to the elevator car
212 support roller
214 car control
216 wireless transmission means
218 power supply
220 roller arrangement
222 mounting base
224 support arm
226 drive member

The invention claimed is:

1. An elevator, comprising:
at least one elevator shaft;
at least one elevator car traveling in said at least one elevator shaft;
at least one elevator motor comprising at least one linear stator located vertically along the at least one elevator shaft and at least one mover located in connection with the at least one elevator car and co-acting with the at least one linear stator; and
a vertical stator beam supporting the at least one linear stator, the vertical stator beam having four side faces carrying ferromagnetic poles of the at least one linear stator spaced apart by a pitch,
wherein the at least one mover comprises counter-faces facing said four side faces of the vertical stator beam, electro-magnetic components of the at least one mover being located in said counter-faces,
wherein the at least one mover includes at least two arms corresponding to the four side faces of the vertical stator beam, and each arm has a counter-face carrying counter-face electro-magnetic components that face and co-act with the corresponding ferromagnetic poles of the corresponding side faces, wherein the at least one elevator motor is a flux-switching permanent magnet motor (FSPM), wherein at least two side faces of the four side faces are provided with stator poles having the same pitch and the vertical position of the stator poles of both side faces is mutually offset, and wherein the four side faces of the vertical stator beam have the same pitch, and the pitch of the opposite side faces is identical whereas the pitch of the side faces extending in right angles is offset in a vertical direction.

2. The elevator according to claim 1, wherein the at least one stator and the at least one mover form a guide for the travel of the at least one elevator car in the at least one elevator shaft.

3. The elevator according to claim 2, wherein ferromagnetic stator poles of the stator beam and the electro-magnetic components of the at least one mover form a magnetic bearing for the guide and suspension of the at least one elevator car.

4. The elevator according to claim 1, wherein the at least one mover has separate magnetic bearing coils which are controlled independent of electro-magnetic mover components of the linear motor, which are controlled to regulate an air gap of the linear motor, which separate magnetic bearing coils co-act with the at least one linear stator.

5. The elevator according to claim 1, wherein the stator beam comprises a vertical support structure for at least two stators and at least one fastening element to fix the support structure to the at least one elevator shaft.

6. The elevator according to claim 5, wherein the at least one mover has a vertically extending C-profile or U-Profile surrounding the stator beam.

7. The elevator according to claim 6, wherein the at least one mover has four counter-faces arranged in a rectangular configuration and facing the four side faces of the stator beam, wherein each of the counter-faces comprises the electro-magnetic components of the at least one mover and the opening in the C-profile is configured to accommodate (the) fastening element of the stator beam.

8. The elevator according to claim 1, wherein the cross section of the stator beam is rectangular.

9. The elevator according to claim 1, wherein at least two elevator cars are configured to travel within one elevator shaft.

10. The elevator according to claim 1, having at least two elevator shafts located side by side and being connected at least at their top and/or bottom ends by a horizontal passage, whereby the two elevator shafts are configured to accommodate more than two elevator cars traveling therein.

11. The elevator according to claim 10, wherein in the horizontal passage(s) a horizontal moving mechanism is provided for moving the at least one elevator car in horizontal direction between the at least two elevator shafts.

12. The elevator according to claim 11, wherein the horizontal moving mechanism comprises a horizontal moving means mounted in connection with the at least one elevator car, comprising rollers, whereby at least one of the rollers is driven, and which horizontal moving mechanism comprises at least one horizontal guide track(s) located in the horizontal passage and extending into the at least two elevator shafts on both sides of the horizontal passage.

13. The elevator according to claim 10, wherein the at least two elevator shafts and their upper and lower horizontal passages form a closed traveling path.

14. The elevator according to claim 10, wherein landing doors of the elevator are located in horizontal passages between the at least two elevator shafts.

15. The elevator according to claim 10, wherein the two elevator cars are rucksack suspended with guide rails and stator beams located on shaft sides which are opposite to the horizontal passages.

16. The elevator according to claim 10, wherein the at least one mover is in a direction of the horizontal passages releasable from the stator beam.

17. The elevator according to claim 10, wherein at least a part of the guide rollers of the at least one elevator car is releasable from a corresponding guide rail.

18. The elevator according to claim 10, wherein a busbar with vertical conductor rails is located along the length of the at least one elevator shaft, and the at least one elevator car has at least one contactor connecting the conductor rails.

19. The elevator according to claim 10, wherein the at least one elevator car has a wireless connection to a elevator control.

20. The elevator according to claim 10, wherein the at least one elevator car has a power source, which is configured as back-up power source for the at least one mover.

21. The elevator according to claim 1, being a high rise elevator with a vertical length of more than 50 m.

22. The elevator according to claim 1, wherein the at least one elevator car has at least two movers located above each other and spaced apart in an upper and lower half of the at least one elevator car.

23. The elevator according to claim 1, wherein the ferromagnetic poles are teeth provided on a side face of a ferromagnetic stator rod, the teeth being spaced apart by teeth gaps.

24. The elevator according to claim 1, wherein the at least one linear stator does not have any permanent magnets and does not have any windings.

25. An elevator, comprising:
at least one elevator shaft;
at least one elevator car traveling in said at least one elevator shaft;
at least one elevator motor comprising at least one linear stator located vertically along the at least one elevator shaft and at least one mover located in connection with the at least one elevator car and co-acting with the at least one linear stator; and
a vertical stator beam supporting the at least one linear stator, the vertical stator beam having at least one side face carrying ferromagnetic poles of the at least one linear stator spaced apart by a pitch, wherein the at least one mover comprises at least one counter-face facing said at least one side face of the vertical stator beam, electro-magnetic components of the at least one mover being located in said at least one counter-face,
wherein the vertical stator beam includes at least two side faces each carrying ferromagnetic poles, the mover includes at least two arms corresponding to the two side faces of the vertical stator beam, and each arm has a counter-face carrying counter-face electro-magnetic components that face and co-act with the corresponding ferromagnetic poles of the corresponding side face,
wherein the elevator includes at least two of said elevator shaft located side by side and being connected at least at their top and/or bottom ends by a horizontal passage, the two elevator shafts being configured to accommodate more than two elevator cars traveling therein,
wherein in the horizontal passage(s) a horizontal moving mechanism is provided for moving the at least one elevator car in horizontal direction between the at least two elevator shafts, and wherein the horizontal moving mechanism comprises a horizontal moving means mounted in connection with the at least one elevator car, comprising rollers, whereby at least one of the rollers is driven, and which horizontal moving mechanism comprises at least one horizontal guide track(s) located in the horizontal passage and extending into the at least two elevator shafts on both sides of the horizontal passage, wherein the rollers are movable from a retracted position into a drive position, wherein the rollers co-act with the at least one guide track.

26. An elevator, comprising:

at least one elevator shaft;

at least one elevator car traveling in said at least one elevator shaft;

at least one elevator motor comprising at least one linear stator located vertically along the at least one elevator shaft and at least one mover located in connection with the at least one elevator car and co-acting with the at least one linear stator; and a vertical stator beam supporting the at least one linear stator, the vertical stator beam having at least one side face carrying ferromagnetic poles of the at least one linear stator spaced apart by a pitch, wherein the at least one mover comprises at least one counter-face facing said at least one side face of the vertical stator beam, electro-magnetic components of the at least one mover being located in said at least one counter-face, wherein the vertial stator beam includes at least two side faces each carrying ferromagnetic poles, the mover includes at least two arms corresponding to the two side faces of the vertical stator beam, and each arm has a counter-face carrying counter-face electro-magnetic components that face and co-act with the corresponding ferromagnetic poles of the corresponding side faces, wherein the at least one elevator motor is a flux-switching permanent magnet motor (FSPM), and wherein at least two parallel stator beams are located in the at least one elevator shaft and the at least one elevator car has at least two movers located parallel to each other and in a horizontal distance of at least a half of the car width, each of which co-acting with one of the stator beams.

\* \* \* \* \*